(12) United States Patent
Gollakota et al.

(10) Patent No.: US 10,187,241 B2
(45) Date of Patent: Jan. 22, 2019

(54) APPARATUSES, SYSTEMS, AND METHODS FOR COMMUNICATING USING MIMO AND SPREAD SPECTRUM CODING IN BACKSCATTER OF AMBIENT SIGNALS

(71) Applicant: UNIVERSITY OF WASHINGTON, Seattle, WA (US)

(72) Inventors: Shyamnath Gollakota, Seattle, WA (US); Joshua R. Smith, Seattle, WA (US); Aaron N. Parks, Seattle, WA (US); Angli Liu, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/958,880

(22) Filed: Apr. 20, 2018

(65) Prior Publication Data
US 2018/0241604 A1     Aug. 23, 2018

Related U.S. Application Data

(63) Continuation of application No. 15/118,432, filed as application No. PCT/US2015/015430 on Feb. 11, 2015, now Pat. No. 9,973,367.
(Continued)

(51) Int. Cl.
*H04L 1/02*     (2006.01)
*H04L 27/26*    (2006.01)
(Continued)

(52) U.S. Cl.
CPC ........... *H04L 27/2649* (2013.01); *H04B 1/40* (2013.01); *H04B 7/0413* (2013.01); *H04K 3/25* (2013.01); *H04K 2203/20* (2013.01)

(58) Field of Classification Search
CPC .............. H04L 5/0016; H04L 5/0005; H04L 2025/03426; H04L 27/10; H04L 1/0017;
(Continued)

(56) References Cited

U.S. PATENT DOCUMENTS

| 4,298,280 A | 11/1981 | Harney |
| 4,916,460 A | 4/1990 | Powell |

(Continued)

FOREIGN PATENT DOCUMENTS

| EP | 2976734 | 1/2016 |
| WO | 2014153516 A1 | 9/2014 |

(Continued)

OTHER PUBLICATIONS

International Search Report and Written Opinion dated May 20, 2015 received for PCT/US2015/015430.
(Continued)

*Primary Examiner* — Rahel Guarino
(74) *Attorney, Agent, or Firm* — Dorsey & Whitney LLP (57) ABSTRACT

Apparatuses, systems, ambient RF backscatter transceivers, and methods for communicating using MIMO and spread spectrum coding of backscattered ambient RF signals are described. An example system may include an ambient RF backscatter transceiver that include an antenna configured to receive a backscattered ambient radio frequency (RF) signal, and a receiver coupled to the antenna. The receiver may be configured to demodulate the backscattered ambient RF signal using one of multiple input, multiple output multiplexing demodulation or spread spectrum code demodulation to retrieve the first data. The backscattered ambient RF signal may be generated by backscattering an ambient RF signal at a first frequency. The ambient RF signal may be configured to provide other data at a second frequency.

13 Claims, 5 Drawing Sheets

Related U.S. Application Data (60) Provisional application No. 61/938,569, filed on Feb. 11, 2014.

(51) Int. Cl.
*H04K 3/00* (2006.01)
*H04B 1/40* (2015.01)
*H04B 7/0413* (2017.01)

(58) Field of Classification Search
CPC .............. H04L 27/2601; H04L 9/0662; H04L 27/2649; H01Q 15/18; H04B 7/10; H04B 1/69; H04B 1/0057; H04B 7/0814; H04B 7/0413; H04B 1/40; H04W 4/008; H04W 16/14; H04W 40/12; H04K 3/25; H04K 2203/20
See application file for complete search history.

(56) References Cited

U.S. PATENT DOCUMENTS

| | | |
|---|---|---|
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,995,040 A | 11/1999 | Issler et al. |
| 6,084,530 A | 7/2000 | Pidwerbetsky et al. |
| 6,094,450 A | 7/2000 | Shockey |
| 6,243,012 B1 | 6/2001 | Shober et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,870,460 B2 | 3/2005 | Turner et al. |
| 6,970,089 B2 | 11/2005 | Carrender |
| 7,180,402 B2 | 2/2007 | Carrender et al. |
| 7,215,976 B2 | 5/2007 | Brideglall |
| 7,358,848 B2 | 4/2008 | Mohamadi |
| 7,469,013 B1 | 12/2008 | Bolt et al. |
| 7,796,016 B2 | 9/2010 | Fukuda |
| 7,839,283 B2 | 11/2010 | Mohamadi et al. |
| 7,961,093 B2 | 6/2011 | Chiao et al. |
| 7,995,685 B2 | 8/2011 | Wang et al. |
| 8,026,839 B2 | 9/2011 | Weber |
| 8,170,485 B2 | 5/2012 | Hulvey |
| 8,284,032 B2 | 10/2012 | Lee et al. |
| 8,391,824 B2 | 3/2013 | Kawaguchi |
| 8,526,349 B2 | 9/2013 | Fisher |
| 8,797,146 B2 | 8/2014 | Cook et al. |
| 8,971,704 B2 | 3/2015 | Cavaliere et al. |
| 9,312,950 B1 | 4/2016 | Deyle |
| 9,357,341 B2 | 5/2016 | Deyle |
| 9,680,520 B2 | 6/2017 | Gollakota et al. |
| 10,033,424 B2 | 7/2018 | Gollakota et al. |
| 2002/0015436 A1 | 2/2002 | Ovard et al. |
| 2003/0043949 A1* | 3/2003 | O'Toole .............. H03L 7/0995 375/374 |
| 2003/0133495 A1 | 7/2003 | Lerner et al. |
| 2003/0174672 A1 | 9/2003 | Herrmann |
| 2004/0005863 A1* | 1/2004 | Carrender ............ G06K 7/0008 455/41.1 |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1* | 9/2005 | Volpi .................. G06K 7/0008 375/150 |
| 2005/0265300 A1 | 12/2005 | Rensburg |
| 2006/0044147 A1 | 3/2006 | Knox et al. |
| 2006/0045219 A1 | 3/2006 | Wang et al. |
| 2006/0082458 A1 | 4/2006 | Shanks et al. |
| 2006/0087406 A1 | 4/2006 | Willins et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0109121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0207357 A1 | 8/2008 | Savarese et al. |
| 2008/0211636 A1 | 9/2008 | O'Toole et al. |
| 2008/0225932 A1 | 9/2008 | Fukuda |
| 2008/0252442 A1 | 10/2008 | Mohamadi et al. |
| 2009/0201134 A1 | 8/2009 | Rofougaran |
| 2009/0243804 A1 | 10/2009 | Fukuda |
| 2010/0156651 A1 | 6/2010 | Broer |
| 2010/0271188 A1 | 10/2010 | Nysen |
| 2011/0053178 A1 | 3/2011 | Yang |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1* | 7/2013 | Puleston .............. H04L 67/04 340/10.51 |
| 2013/0215979 A1 | 8/2013 | Yakovlev et al. |
| 2013/0223270 A1 | 8/2013 | Cheng |
| 2013/0265140 A1 | 10/2013 | Gudan et al. |
| 2013/0286959 A1 | 10/2013 | Lou et al. |
| 2013/0322498 A1 | 12/2013 | Maquire |
| 2014/0044233 A1 | 2/2014 | Morton |
| 2014/0113561 A1 | 4/2014 | Maguire |
| 2014/0364733 A1 | 12/2014 | Huang et al. |
| 2015/0311944 A1 | 10/2015 | Gollakota et al. |
| 2015/0381269 A1 | 12/2015 | Deyle |
| 2016/0365890 A1 | 12/2016 | Reynolds et al. |
| 2017/0180075 A1 | 6/2017 | Gollakota et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |

FOREIGN PATENT DOCUMENTS

| | | |
|---|---|---|
| WO | 2015123306 A1 | 8/2015 |
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |
| WO | 2018075653 A1 | 4/2018 |

OTHER PUBLICATIONS

PCT Application No. PCT/US2018/026545 titled 'Image and/or Video Transmission Using Backscatter Devices' filed on Apr. 6, 2018.

U.S. Appl. No. 15/752,214 entitled 'Backscatter Devices and Network Systems Incorporating Backscatter Devices' filed Feb. 12, 2018, pp. all.

"Advanced Television Systems Committee (ATSC) (Sep. 1995) "ATSC Digital Television Standard," ATSC Doc. A/53, 74 pages", Sep. 1995.

"Analog Devices (retrieved Apr. 2016) "ADG9I9 RF Switch Datasheet," available online at: http://www.datasheet-pdf.com/PDF/ADG919-Datasheet-AnalogDevices-140819", Apr. 2016.

"Analog Devices, Inc. (retrieved Jan. 2016) "ADG902 RF switch datasheet," available online at: http://www.analog.com/static/imported-files/data_sheets/adg901_902.pdf", Jan. 2016.

(56) References Cited

OTHER PUBLICATIONS

"Axcera.com (retrieved Jan. 2016) "8VSB vs. COFDM," available online at: http://www.axcera.com/downloads/technotes-whitepapers/technote_4,pdf", Jan. 2016.
"DiBEG (May 2014; retrieved Jan. 2016) "The Launching Country," available online at: http://www.dibeg.org/world/world.html", May 2014.
"E. Inc. (retrieved Apr. 2016) "Universal software radio peripheral," available online at: http://ettus.com", Apr. 2016.
"Encounternet (retrieved Jan. 2016) "The Encounternet Project," available online at: http://encounternet.net/", Jan. 2016.
"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.
"STMicroelectronics (Jul. 2012) "TS 881 Datasheet," 1 page", Jul. 2012.
Anthony, Sebastian, "Free energy harvesting from TV signals, to power a ubiquitous internet of things", ExtremeTech, google search, Jul. 8, 2013, 8 pages.
Bharadia, et al., "Full duplex backscatter", Proceedings of the 12th ACM Workshop on Hot Topics in Networks, Article No. 4, pp. 1-7, Nov. 2013.
Bharadia, et al., "Full duplex radios", Proceedings of the ACM SIGCOMM 2013 (SIGCOMM '13), pp. 375-386, Aug. 2013.
Bohorquez, et al,, "A 350µW CMOS MSK transmitter and 400µW OOK super-regenerative receiver for medical implant communications", IEEE Journal of Solid-State Circuits, 44(4):1248-1259, Apr. 2009.
Buettner, "Backscatter Protocols and Energy-Efficient Computing for RF-Powered Devices", PhD Thesis, University of Washington, Seattle, WA, 144 pages, Retrieved Jan. 2016., 2012.
Buettner, et al,, "Dewdrop: An energy-aware runtime for computational RFID", Proceedings of the 8th USENIX Conference on Networked Systems Design and Implementation (NSDI'11), pp. 197-210, Mar. 2011.
Buettner, et al., "RFID Sensor Networks with the Intel WISP", Proceedings of the 6th ACM Conference on Embedded Network Sensor Systems (SenSys '08), pp. 393-394, Nov. 2008.
Dayhoff, "New Policies for Part 15 Devices", Federal Communications Commission (FCC) Telecommunications Certification Body Council (TCBC) Workshop 2005, 13 pages, May 2005.
Dementyev, et al., "Wirelessly Powered Bistable Display Tags", ACM International Joint Conference on Pervasive and Ubiquitous Computing (UbiComp '13), pp. 383-386, Sep. 2013.
Dementyev, A. et al., "A Wearable UHF RFID-Based EEG System", 2013 IEEE International Conference on RFID (RFID), pp. 1-7, Apr.-May 2013.
Duarte, et al., "Full-duplex wireless communications using off-the-shelf radios: Feasibility and first results", 2010 Conference Record of the 44th Asilomar Conference on Signals, Systems and Computers (ASILOMAR), pp. 1558-1562, Nov. 2010.
Duarte, "Full-duplex Wireless: Design, Implementation and Characterization", Ph.D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016., 2006.
Elliott, "Average U.S. Home Now Receives a Record 118.6 TV Channels, According to Nielsen", available online at: http://www.nielsen.com/us/en/insights/pressroom/2008/average_u_s_home.html, Jun. 2008.
Gorlatova, et al., "Energy harvesting active networked tags (EnHANTs) for ubiquitous object networking", IEEE Wireless Communications, 17(6):18-25, Dec. 2010.
Guo, et al., "Virtual full-duplex wireless communication via rapid on-off-division duplex", 48th Annual Allerton Conference on Communication, Control, and Computing (Allerton), pp. 412-419, Sep.-Oct. 2010.
Jain, et al., "Practical, real-time, full duplex wireless", Proceedings of the 17th Annual International Conference on Mobile Computing and Networking (MobiCom'11) pp. 301-312, Sep. 2011.
Johnston, Scott, "Software Defined Radio Hardware Survey", Oct. 2011, 31 pgs.
Kellogg, et al., "Bringing gesture recognition to all devices", Proceedings of the 11th USENIX Conference on Network Systems Design and Implementation (NSDI'14), pp. 303-316, Apr. 2014.
Kellogg, et al., "Wi-Fi Backscatter: Internet Connectivity for RF-Powered Devices", University of Washington, SIGCOMM'14, Aug. 17-22, 2014.
Kim, et al., "Flush: A reliable bulk transport protocol for multihop wireless networks", Proceedings of the 5th International Conference on Embedded Networked Sensor Systems (SenSys '07), pp. 351-365, Nov. 2007.
Kleinrock, et al., "Packet Switching in Radio Channels: Part I—Carrier Sense Multiple-Access Modes and Their Throughput-Delay Characteristics", IEEE Transactions on Communications, 23(12):1400-1416, Dec. 1975.
Kodialam, et al., "Fast and reliable estimation schemes in RFID systems", Proceedings of the 12th Annual International Conference on Mobile Computing and Networking (MobiCom '06), pp. 322-333, Sep. 2006.
Koomey, JG et al., "Implications of Historical Trends in the Electrical Efficiency of Computing", IEEE Annals of the History of Computing, 33(3):46-54, Aug. 2011.
Kuester, et al., "Baseband Signals and Power in Load-Modulated Digital Backscatter," IEEE Antenna and Wireless Propagation Letter, vol. II, 2012, pp. 1374-1377, Nov. 2012.
Lazarus, "Remote, wireless, ambulatory monitoring of implantable pacemakers, cardioverter defibrillators, and cardiac resynchronization therapy systems: analysis of a worldwide database", Pacing and Clinical Electrophysiology, 30(Suppl 1):S2-S12, Jan. 2007.
Liang, et al., "Surviving wi-fi interference in low power zigbee networks", Proceedings of the 8th ACM Conference on Embedded Networked Sensor Systems (SenSys '10), pp. 309-322, Nov. 2010.
Liu, et al., "Ambient Backscatter: Wireless Communication Out of Thin Air," University of Washington, retrieved Jan. 11, 2016, pp. 1-12.
Liu, et al., "Ambient Backscatter: Wireless Communication out of Thin Air", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.
Liu, et al., "Digital Correlation Demodulator Design for RFID Reader Receiver", IEEE Wireless Communications and Networking Conference (WCNC 2007), pp. 1666-1670, Mar. 2007.
Liu, et al., "Enabling Instantaneous Feedback with Full-duplex Backscatter", Proceedings of the 20th Annual International Conference on Mobile Computing and Networking (MobiCom'14), pp. 67-78, Sep. 2014.
Mace, "Wave reflection and transmission in beams", Journal of Sound and Vibration, 97(2):237-246, Nov. 1984.
Mastrototaro, "The MiniMed Continuous Glucose Monitoring System", Diabetes Technology & Therapeutics, 2(Suppl 1):13-18, Dec. 2000.
Metcalfe, et al., "Ethernet: Distributed packet switching for local computer networks", Communications of the ACM, 19(7):395-404, Jul. 1976.
Mishra, et al., "Supporting continuous mobility through multi-rate wireless packetization", Proceedings of the 9th Workshop on Mobile Computing Systems and Applications (HotMobile '08), pp. 33-37, Feb. 2008.
Murray Associates, "The Great Seal Bug Part 1", Murray Associates, Mar. 2017.
Mutti, et al., "CDMA-based RFID Systems in Dense Scenarios: Concepts and Challenges", 2008 IEEE International Conference on RFID, pp. 215-222, Apr. 2008.
Nikitin, et al., "Passive tag-to-tag communication", 2012 IEEE International Conference on RFID (RFID), pp. 177-184, Apr. 2012.
Nikitin, et al., "Theory and measurement of backscattering from RFID tags", IEEE Antennas and Propagation Magazine, 48(6):212-218, Dec. 2006.

(56) References Cited

OTHER PUBLICATIONS

Obeid, et al., "Evaluation of spike-detection algorithms for a brain-machine interface application", IEEE Transactions on Biomedical Engineering, 51(6):905-911, Jun. 2004.
Occhiuzzi, et al., "Modeling, Design and Experimentation of Wearable RFID Sensor Tag", IEEE Transactions on Antennas and Propagation, 58(8):2490-2498, Aug. 2010.
Pandey, et al., "A Sub-100 µW MICS/ISM Band Transmitter Based on Injection-Locking and Frequency Multiplication", IEEE Journal of Solid-State Circuits, 46(5):1049-1058, May 2011.
Parks, et al., "A wireless sensing platform utilizing ambient RF energy", 2013 IEEE Topical Conference on Biomedical Wireless Technologies, Networks, and Sensing Systems (BioWireleSS), pp. 154-156, Jan. 2013.
Parks, Aaron N. et al., "Turbocharging Ambient Backscatter Communication", SIGCOMM, Aug. 2014, 1-12.
Pillai, et al., "An Ultra-Low-Power Long Range Battery/Passive RFID Tag for UHF and Microwave Bands With a Current Consumption of 700 nA at 1.5 V", IEEE Transactions on Circuits and Systems I: Regular Papers, 54(7):1500-1512, Jul. 2007.
Qing, et al., "A folded dipole antenna for RFID", IEEE Antennas and Propagation Society International Symposium, 1:97-100, Jun. 2004.
Rabaey, et al., "PicoRadios for wireless sensor networks: the next challenge in ultra-low power design", 2002 IEEE International Solid-State Circuits Conference, Digest of Technical Papers (ISSCC), 1:200-201, Feb. 2002.
Ransford, et al., "Mementos: system support for long-running computation on RFID-scale devices", ACM SIGPLAN Notices—Proceedings of the 16th International Conference on Architecturla Support for Programming Languages and Operating Systems (ASPLOS '11), 46(3):159-170, Mar. 2011.
Rao, KVS et al., "Antenna design for UHF RFID tags: a review and a practical application", IEEE Transactions on Antennas and Propagation, 53(12):3870-3876, Dec. 2005.
Roy, et al., "RFID: From Supply Chains to Sensor Nets", Proceedings of the IEEE, 98(9):1583-1592, Jul. 2010.
Sample, et al., "Design of an RFID-Based Battery-Free Programmable Sensing Platform", IEEE Transactions on Instrumentation and Measurement, 57(11):2608-2615, Nov. 2008.
Sample, et al., "Experimental results with two wireless power transfer systems", IEEE Radio and Wireless Symposium (RAWCON), pp. 16-18, Jan. 2009.
Seigneuret, et al., "Auto-tuning in passive UHF RFID tags", 2010 8th IEEE International NEWCAS Conference (NEWCAS), pp. 181-184, Jun. 2010.
Sen, et al., "CSMA/CN: Carrier sense multiple access with collision notification", Proceedings of the 16th Annual International Conference on Mobile Computing and Networking (MobiCom'10), pp. 25-36, Sep. 2010.
Smith, Jr et al., "A wirelessly-powered platform for sensing and computation", ACM International Joint Conference on Pervasive and Ubiquitous Computing (UbiComp 2006), 4206:495-506, Sep. 2006.
So, et al., "Multi-channel mac for ad hoc networks; handling multi-channel hidden terminals using a single transceiver", Proceedings of the 5th ACM International Symposium on Mobile Ad Hoc Networking and Computing, pp. 222-233, May 2004.
Srinivasan, et al., "An empirical study of low-power wireless", ACM Transactions on Sensor Networks (TOSN), vol. 6, Issue 2, Article No. 16, Feb. 2010.
Thomas, et al., "A 96 Mbit/sec, 15.5 pJ/bit 16-QAM modulator for UHF backscatter communication", 2012 IEEE International Conference on RFID (RFID), IEEE RFID Virtual Journal, pp. 185-190, Apr. 2012.
Tubaishat, et al., "Sensor networks: an overview", IEEE Potentials, 22(2):20-23, Apr.-May 2003.
Walden, "Analog-to-digital converter survey and analysis", IEEE Journal on Selected Areas in Communications, 17(4):539-550, Apr. 1999.
Welbourne, et al., "Building the Internet of Things Using RFID: The RFID Ecosystem Experience", IEEE Internet Computing, 13(3):48-55, May-Jun. 2009.
Wuu, et al., "Zero-Collision RFID Tags Identification Based on CDMA", 5th International Conference on Information Assurance and Security (IAS '09), pp. 513-516, Aug. 2009.
Yi, et al., "Analysis and Design Strategy of UHF Micro-Power CMOS Rectifiers for Micro-Sensor and RFID Applications", IEEE Transactions on Circuits and Systems I: Regular Papers, 54(1):153-166, Jan. 2007.
Zalesky, et al., "Integrating segmented electronic paper displays into consumer electronic devices", 2011 IEEE International Conference on Consumer Electronics (ICCE), pp. 531-532, Jan. 2011.
Zhang, et al., "Frame retransmissions considered harmful: improving spectrum efficiency using micro-ACKs", Proceedings of the 18th Annual International Conference on Mobile Computing and Networking (MobiCom '12), pp. 89-100, Aug. 2012.
Zhang, et al., "EkhoNet: High Speed Ultra Low-power Backscatter for Next Generation Sensors", School of Computer Science, University of Massachusetts, Amherst, MA 01003, Sep. 2014.
Cadence, "Cadence Spectre RF Option", http://www.cadence.com/products/rf/spectre_rf_simulation/pages/default.aspx. (Retrieved Jul. 19, 2018).
Digipoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
NASA, "A Wi-Fi Reflector Chip to Speed Up Wearables", http://www.jpl.nasa.gov/news/news.php?feature=4663. Jul. 22, 2015.
Qualcomm, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).
Qualcomm. "QCA4002/4004 Qualcomm low-power Wi-Fi", http://www.eeworld.com.cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 16/072,858, titled "Backscatter Devices Including Examples of Single Sideband Operations", filed Jul. 25, 2018.
"Altera de1 fpga development board", http://www.terasic.com.tw/cgi-bin/page/archive.pl?No=83.(Retrieved Jul. 19, 2018).
"Analog Devices HMC190BMS8/190BMS8E", https://www.hittite.com/content/documents/data_sheet/hmc190bms8.pdf. (Retrieved Jul. 19, 2018).
"Nest Cam Indoor", https://nest.com/camera/meet-nest-cam/?dropcam=true. 2018. (Retrieved Jul. 19, 2018).
Bharadia, et al., "Backfi: High Throughput WiFi Backscatter". In Proceedings of the 2015 ACM Conference on Special Interest Group on Data Communication, Aug. 2015.
Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging and Embedded Business Unit, Marvell Semiconductor, Inc., Mar. 2010.
Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).
Greene, et al., "Intel's Tiny Wi-Fi Chip Could Have a Big Impact", MIT Technology review, Sep. 21, 2012.
Javed, et al., Sajid Javed et al, Background Subtraction Via Superpixel-Based Online Matrix Decomposition With Structured Foreground Constraints, ICCVW '15 Proceedings of the 2015 IEEE International Conference on Computer Vision Workshop, Dec. 2015.
Kellogg, et al., "Wi-fi backscatter: Internet connectivity for rf-powered devices". In Proceedings of the 2014 ACM Conference on SIGCOMM, Aug. 2014.

(56) References Cited

OTHER PUBLICATIONS

Khannur, et al., "A Universal UHF RFID reader IC in 0.18-μm CMOS Technology". Solid-State Circuits, IEEE Journal of, 43(5):1146-1155, May 2008.
Lu, et al., "Enfold: Downclocking OFDM in WiFi". In Proceedings of the 20th annual international conference on Mobile computing and networking, pp. 129-140. ACM, Sep. 2014.
Lu, et al., "Slomo: Downclocking WiFi Communication". In NSDI, pp. 255-258, Apr. 2013.
Manweiler, et al., "Avoiding the Rush Hours: Wifi Energy Management via Traffic Isolation". In MobiSys, Jul. 2011.
Merritt, "Atheros targets cellphone with Wi-Fi chip", EE Times (Nov. 2, 2009), http://www.eetimes.com/document.asp?doc_id=1172134.
Mittal, et al., "Empowering developers to estimate app energy consumption". In MobiCom, Aug. 2012.
Naderiparizi, et al., "Ultra-Low-Power Wireless Streaming Cameras", arXiv:1707.08718v1, Jul. 27, 2017, Cornell University Library.
Navaneethan, et al., Security Enhancement of Frequency Hopping Spread Spectrum Based on Oqpsk Technique. IOSR Journal of Electronics and Communication Engineering, May 2016. 62.
Proakis, et al., "Digital communications". 2005. McGraw-Hill, New York. (Retrieved Jul. 19, 2018).
Rattner, et al., "Connecting the Future: It's a Wireless World", Sep. 2013.
Ying, et al., "A System Design for UHF RFID Reader". In Communication Technology, 2008. ICCT 2008. 11th IEEE International Conference on, pp. 301-304. IEEE, Nov. 2008.

* cited by examiner

APPARATUSES, SYSTEMS, AND METHODS FOR COMMUNICATING USING MIMO AND SPREAD SPECTRUM CODING IN BACKSCATTER OF AMBIENT SIGNALS

CROSS REFERENCE TO RELATED APPLICATION(S)

This application is a continuation of U.S. patent application Ser. No. 15/118,432, filed Aug. 11, 2016, and issued as U.S. Pat. No. 9,973,367 on May 15, 2018, which is a 371 National Stage Application of PCT Application No. PCT/US2015/015430, filed on Feb. 11, 2015, which claims the benefit under 35 U.S.C. § 119 of provisional application U.S. Ser. No. 61/938,569, filed Feb. 11, 2014. The aforementioned applications and patent are hereby incorporated by reference, in their entirety, for any purpose.

TECHNICAL FIELD

Examples described herein are directed generally to wireless data transmission. In particular, examples are described that transmit data wirelessly by modulating a backscatter of an ambient RF signal.

BACKGROUND

Computing devices are increasingly embedded in objects and environments such as appliances, thermostats, books, furniture, and even implantable medical devices. A key issue is how to power these devices as they become smaller and numerous; wires are often not feasible, and batteries add weight, bulk, cost, and require recharging or replacement that adds costs and is difficult at large scales. Generating a conventional radio wave typically requires much more power than can be harvested from ambient RF signals. Traditional backscatter communication (e.g., RFID) provides a form of communicating by modulating reflections of an incident RF signal (e.g., rather than generating RF waves). Therefore, traditional backscatter transmission is orders of magnitude more energy-efficient than conventional radio communication. However, traditional backscatter communication requires deployment of a special purpose power infrastructure (e.g., an RFID reader) to transmit a high-power (1 W) signal to nearby devices, which the nearby devices use to backscatter. Additionally, traditional RFID systems, RFID tags must talk exclusively to an RFID reader and are unable to even sense the transmissions of other RFID tags. Further, traditional backscatter communication has a very limited range and bandwidth as compared with traditional computing device communication.

SUMMARY

The summary is provided here by way of example and is not intended to limit the scope of any of the described examples or claims.

Examples of the present disclosure include systems, ambient RF backscatter transceivers, and methods. An example system may include an ambient RF backscatter transceiver that include an antenna configured to receive a backscattered ambient radio frequency (RF) signal, and a receiver coupled to the antenna. The receiver may be configured to demodulate the backscattered ambient RF signal using one of multiple input, multiple output multiplexing demodulation or spread spectrum code demodulation to retrieve the first data. The backscattered ambient RF signal may be generated by backscattering an ambient RF signal at a first frequency. The ambient RF signal may be configured to provide other data at a second frequency.

Examples of ambient RF backscatter transceivers may include a first antenna configured to receive a backscattered ambient radio frequency (RF) signal and to provide a first backscattered signal, the backscattered ambient RF signal encoded with first data via backscatter modulation of an ambient RF signal at a first frequency. The ambient RF signal may be modulated to provide second data at a second frequency. The example ambient RF backscatter transceivers may further include a second antenna configured to receive the backscattered ambient radio frequency (RF) signal and to provide a second backscattered signal having a phase offset relative to the first backscattered signal. The example ambient RF backscatter transceivers may further include a receiver coupled to the first antenna and the second antenna. The receiver may be configured to demodulate the backscattered ambient RF signal using multiple input, multiple output multiplexing demodulation based on a ratio of a magnitude of the first backscattered signal to a magnitude of the second backscattered signal to provide output bits. The example ambient RF backscatter transceivers may further include a microcontroller coupled to the receiver and configured to decode the output bits to retrieve data that is transmitted via the backscattered ambient RF signal.

Examples of ambient RF backscatter transceivers may include an antenna configured to receive a backscattered ambient radio frequency (RF) signal. The backscattered ambient RF signal may be encoded with using spread spectrum coding of data bits via chips via backscatter modulation of an ambient RF signal at a first frequency. The ambient RF signal modulated to provide second data at a second frequency. The example ambient RF backscatter transceivers may further include a receiver coupled to the antenna. The receiver may be configured to demodulate the backscattered ambient RF signal using spread spectrum code demodulation based on an in-phase and quadrature-phase correlation to provide output bits. The example ambient RF backscatter transceivers may further include a microcontroller coupled to the receiver and configured to decode the output bits to retrieve data that is transmitted via the backscattered ambient RF signal.

An example method may include receiving a backscattered ambient radio frequency (RF) signal at an antenna. The backscattered ambient RF signal may be encoded with first data via backscatter modulation of an ambient RF signal at a first frequency. The ambient RF signal may be modulated to provide second data at a second frequency. The example method may further include demodulating the backscattered ambient RF signal using one of multiple input, multiple output multiplexing demodulation or spread spectrum code demodulation to retrieve the first data.

DETAILED DESCRIPTION

Certain specific details are set forth in the following description and in FIGS. 1-5 to provide a thorough understanding of various embodiments of the technology. Other details including well-known structures and systems often associated with sensors, transmitters, and receivers, have not been set forth in the following disclosure to avoid unnecessarily obscuring the description of the various embodiments of the technology. A person of ordinary skill in the art, therefore, will accordingly understand that the technology may have other embodiments with additional elements, or the technology may have other embodiments without several of the features shown and described below with reference to FIGS. 1-5.

Examples described herein include ambient RF backscatter transceivers that utilize radio frequency (RF) signals to communicate with each other and associated systems and methods. In several embodiments, for example, a system may include an ambient RF backscatter transceiver that is configured to transmit encoded data to a second ambient RF backscatter transceiver by modulating backscatter of an ambient RF signal. The ambient RF backscatter transceivers may include low power circuitry for decoding the backscattered ambient RF signal, such as analog circuitry. In some embodiments, the backscatter transceivers may include a low power multiple input, multiple output (MIMO) multiplexing receivers that may decode the backscattered signal. For example, the MIMO multiplexing receivers may be powered by energy harvested from ambient RF signals. In some embodiments, the backscatter transceivers may include a low power spread spectrum code receiver that decodes the backscattered signal via a coding algorithm that provides benefits of spread spectrum. For example, the spread spectrum code receiver may also be powered by energy harvested from ambient RF signals.

In some embodiments, the ambient RF backscatter transceivers may include power harvest circuitry that harvests power from the ambient RF signal and provides the harvested power to power other circuitry of the ambient RF backscatter transceiver and/or other devices in communication with the harvested power. Ambient RF signals generally include any RF signals which may be received and backscattered by transceivers described herein. The RF signals may be present in the environment from other signal sources, e.g. the ambient RF signals may be generated by telephones, computers, appliances, transceivers, and/or other devices and may be received and backscattered by ambient RF backscatter transceivers described herein.

Ambient RF signals may generally include any ambient RF signal, such as a television transmission signal, a radio transmission signal, a cellular communication signal (e.g., form a base station or a mobile device), a Wi-Fi signal, or any other RF signal. In some embodiments, the ambient RF signal may be a continuously provided RF signal, such as the television signal.

Figure 1:
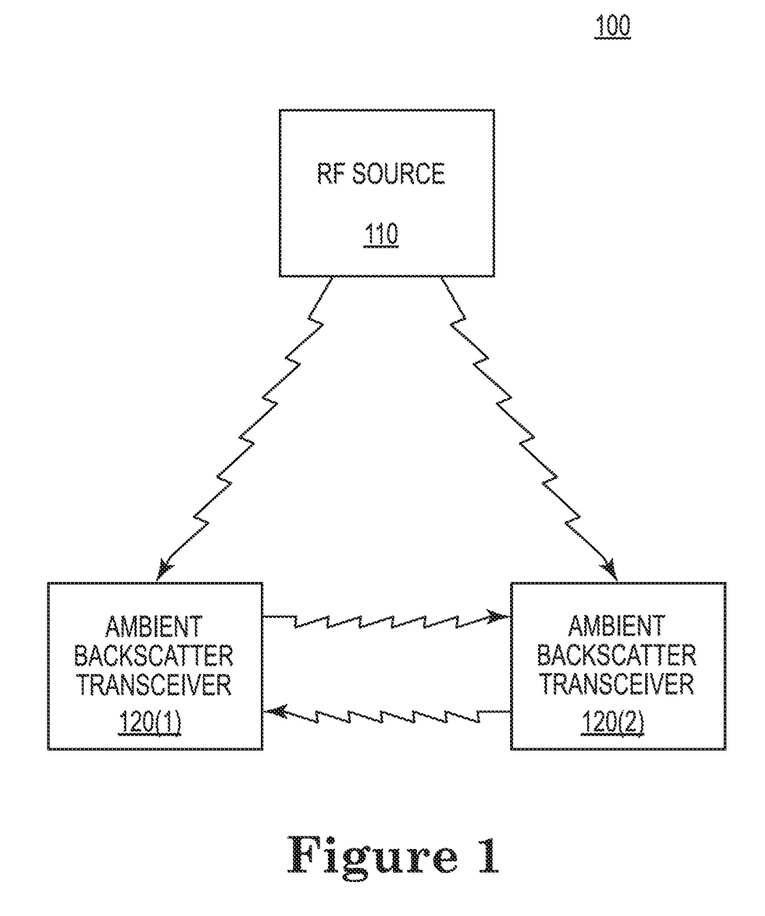
FIG. 1 is a block diagram of an ambient RF backscatter communication system including ambient RF backscatter transceivers according to an embodiment of the disclosure.

FIG. 1 is an illustrative example of an ambient backscatter communication system 100 according to an embodiment of the disclosure. The ambient backscatter system 100 may include a RF source 110 configured to provide a RF signal. The RF signal may include encoded data, such as television broadcast data, cellular communication data, Wi-Fi network communication data, or any other data. The ambient backscatter system 100 may further include ambient RF backscatter transceivers 120(1-2) that are configured to communicate with each other by backscattering the RF signal (e.g., the ambient RF signal) from the RF source 110.

In an example operation where the ambient RF backscatter transceiver 120(1) transmits data to the ambient RF backscatter transceiver 120(2), the ambient RF backscatter transceiver 120(1) may modulate a backscatter of the ambient RF signal from the RF source 110 to provide a backscattered ambient RF signal encoded with the data to the ambient RF backscatter transceiver 120(2). The data transmitted by the ambient RF backscatter transceiver 120(1) may be related to data received from a sensor or an input, or may be related to data received from the ambient RF backscatter transceiver 120(2). The data transmitted by the ambient RF backscatter transceiver 120(1) may typically be different than the data which may be encoded in the ambient RF signal by the RF source 110.

Backscatter communication generally includes modulating reflection of an RF signal at an antenna, rather than generating an RF signal. The ambient RF signal used by the ambient RF backscatter transceiver 120(1) may include an ambient RF signal that is provided by the RF source 110 for another purpose, such as a television broadcast or cellular communication between a base station and a mobile device. In some examples, the backscattered ambient RF signal may be encoded with data using a modulation scheme. To generate the backscattered ambient RF signal, the ambient RF backscatter transceiver 120(1) may modulate the impedance of an antenna to alternate between two discrete states, e.g., reflecting and not-reflecting. The reflecting state of the antenna may provide a reflection of the ambient RF signal, and the non-reflecting state may not reflect the ambient RF signal. Thus, the ambient RF backscatter transceiver 120(1) may indicate either a '0' or a '1' bit by switching the state of the antenna between the reflecting and non-reflecting states. The ambient RF signal that is reflected by the ambient RF backscatter transceiver 120(1) may create an additional path (e.g., a backscattered ambient RF signal) from ambient RF backscatter transceiver 120(1) to the ambient RF backscatter transceiver 120(2). The ambient RF backscatter transceiver 120(2) may decode data encoded in the backscattered ambient RF signal by sensing the reflected power level changes in the backscattered ambient RF signal by the ambient RF backscatter transceiver 120(1). Receivers associated with the RF source 110 (e.g., receivers for TV and cellular applications) may be designed to compensate for multi-path wireless channels to avoid interference of receiving the same signal via multiple paths, and thus may be able to account for (e.g., filter out) the backscattered ambient RF signal from the ambient RF backscatter transceiver 120(1).

In order to decode the backscattered ambient RF signal to retrieve the data, the modulation frequency of the ambient RF signal may be greater than the modulated backscatter frequency of the backscattered ambient RF signal Switching the state of the antenna of the ambient RF backscatter transceiver 120(1) may include adjusting an impedance of the antenna. Generally, when a wave encounters a boundary between two media that have different impedances/densities, the wave gets reflected back. The amount of reflection is typically determined by the difference in the impedance values of the antenna. By modulating the electrical impedance at the antenna, the amount of incident RF energy that is scattered is modulated, thus enabling information to be transmitted. For example, in the reflecting state, the antenna may have low impedance (e.g., a short circuit) to a reference node and may reflect the ambient RF signal to provide a backscattered ambient RF signal that has a first signal amplitude. In the non-reflecting state, the antenna may have high impedance (e.g., an open circuit) to the reference node, and may reflect the ambient RF signal to provide a backscattered ambient RF signal that has a second signal amplitude. The first amplitude may be greater than the second amplitude. In some embodiments, the second amplitude has a nominal or near zero amplitude. The antenna may be designed for a frequency of a targeted ambient RF signal. The ambient RF backscatter transceiver 120(1) may modulate a backscatter of the ambient RF signal to provide the backscattered ambient RF signal at a lower frequency than the modulation frequency of the ambient RF signal. Because the ambient RF signal may already be included encoded data, by modulating a backscatter of the ambient RF signal at a lower frequency may improve reliability in decoding the backscattered ambient RF signal at the ambient RF backscatter transceiver 120(2). The modulation of the backscattered ambient RF signal may be based on a communication mode.

The ambient RF backscatter transceiver 120(2) may receive the backscattered ambient RF signal from the ambient RF backscatter transceiver 120(1). Because the backscattered ambient RF signal is modulated by the ambient RF backscatter transceiver 120(2) at a lower rate than the ambient RF signal, the ambient RF backscatter transceiver 120(2) may separate the ambient RF signal from the backscattered ambient RF signal by leveraging the difference in communication rates.

In some embodiments, the ambient RF backscatter transceiver 120(2) may include MIMO multiplexing circuitry configured to receive and decode the backscattered ambient RF signal. The MIMO multiplexing circuitry may receive and decode data based on the backscattered ambient RF signal received at least two antennae of the ambient RF backscatter transceiver 120(2). Using MIMO multiplexing circuitry may improve sensitivity in detecting and decoding data from the backscattered ambient RF signal, and facilitate an increase in the transmission data rate as compared with a signal antenna demodulation design. In some embodiments, the ambient RF backscatter transceiver 120(2) may include spread spectrum code circuitry configured to receive and decode the backscattered ambient RF signal based on pseudorandom codes modulated in the backscattered ambient RF signal. Using the spread spectrum code circuitry may improve reliability in detecting and decoding data from the backscattered ambient RF signal, and facilitate an increase in a transmission distance and mitigate effects of physical objects between the transmitter and receiver.

While FIG. 1 depicts two ambient RF backscatter transceivers 120(1-2), the ambient backscatter communication system 100 may include more than two ambient RF backscatter transceivers, and ambient backscatter communication may occur between two or more of the ambient RF backscatter transceivers. In some embodiments, the ambient RF backscatter transceivers may, prior to transmitting, use carrier sense to detect a transmission from another ambient RF backscatter transceiver in order to avoid interfering transmissions between the ambient RF backscatter transceivers.

Figure 2:
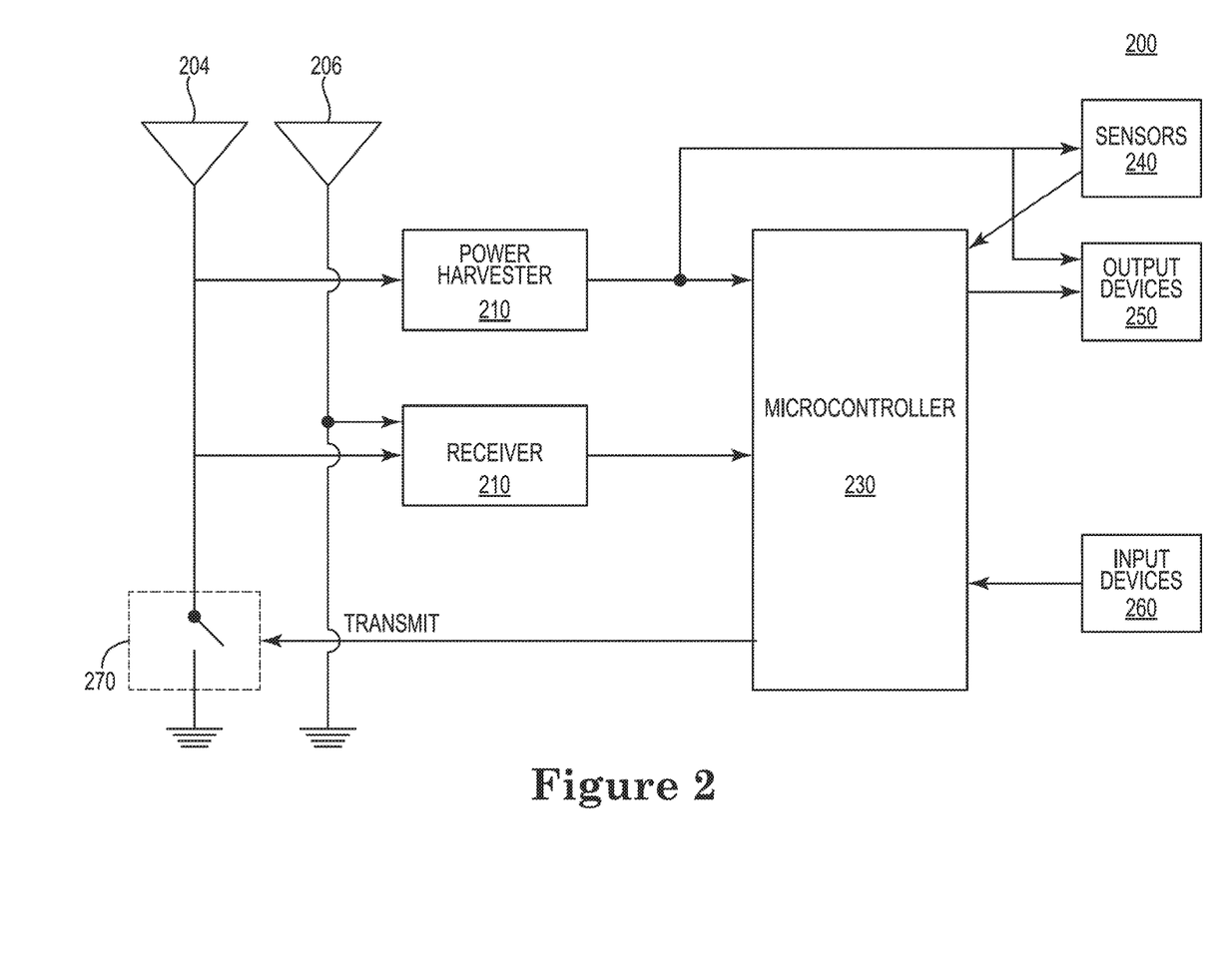
FIG. 2 is a block diagram of an ambient RF backscatter transceiver according to an embodiment of the disclosure.

FIG. 2 is a block diagram of an ambient RF backscatter transceiver 200 in accordance with embodiments of the present disclosure. The ambient RF backscatter transceiver 200 may include, for example, an antenna 204 coupled to a power harvester 210, a receiver 220, and a transmitter 270. The power harvester 210 may be configured to generate power from an ambient RF signal received via the antenna 204 and/or the antenna 206, and provide the power to a microcontroller 230, sensors 240, and output devices 250, and in some embodiments, to the receiver 220. The amount of power that the power harvester 210 is able to harvest from the ambient RF signal may be based on the range and broadcast power of the ambient RF signal. In some examples, the power harvester 210 may harvest at least 60 µW of power from the ambient RF signal. In other embodiments, the power harvester 210 may harvest up to 3 mW from the ambient RF signal. The receiver 220 may demodulate a backscattered ambient RF signal received via the antenna 204 and/or the antenna 206, and provide the demodulated signal to the microcontroller 230. The microcontroller 230 may process the demodulated signal from the receiver 220 to retrieve the data. In some embodiments, the microcontroller may store the data, control the output devices 250 based on the retrieved data, and/or may respond to a transmitting ambient RF backscatter transceiver. The microcontroller 230 may also receive input data from the sensors 240 and/or input devices 260. Based on the input data, the microcontroller 230 may control the transmitter 270 to modulate a backscatter of the ambient RF signal via the antenna 204 to transmit the data. The ambient RF backscatter transceiver 200 may be used to implement the ambient RF backscatter transceivers 120(1-2) of FIG. 1.

The power harvester 210, receiver 220, and transmitter 270 may all be connected to the antenna 204. In some embodiments, the power harvester 210 and receiver 220 may also be connected to a second antenna 206. The receiver 220 and transmitter 270 may use modulated backscattering of an ambient RF signal to communicate with one or more other ambient RF backscatter transceivers 200. The power harvester 210 may harvest energy from the ambient RF signal, and may provide the harvested energy to the power the microcontroller 230 (e.g., micro-controller), sensors 240, and output devices 250, and in some embodiments, to the receiver 220. The power harvester 210, receiver 220, and transmitter 270 may operate independent of each other. While the transmitter 270 is actively modulating a backscattered ambient RF signal, the power harvester 210 and receiver 220 may capture limited power/signals.

In operation, the ambient RF backscatter transceiver 200 may transmit data by modulating a backscatter transmission of an ambient RF signal. The ambient RF backscatter transceiver 200 may also receive data by decoding modulation of a backscattered ambient RF signal. As previously described, backscattering transmission is achieved by changing the impedance of the antenna 204 via the transmitter 270 in the presence of an ambient RF signal. The microcontroller 230 may control the transmitter 270 to modulate the impedance of the antenna 204 and cause a change in the amount of energy of the ambient RF signal reflected by the antenna 204. For example, the microcontroller 230 may receive data from the sensors 240 or the input devices 260 (e.g., respond to a communication received from another ambient RF backscatter transceiver), and may modulate the transmitter 270 to encode the received data by modulating a backscatter of the ambient RF signal to produce the backscattered ambient RF signal that may be received by another ambient RF backscatter transceiver. The data rate of information modulation by the antenna 204 may be based on a communication mode between the transmitting ambient RF backscatter transceiver 200 and a receiving ambient RF backscatter transceiver. For example, when the communication mode is a MIMO multiplexing mode, the modulation rate and data encoding (e.g., faster date rate) may be different than when the communication mode is a spread spectrum coding mode (e.g., slower data rate). Further, the receiver 220 may demodulate a received backscattered ambient RF signal from another ambient RF backscatter transceiver to provide output bits, and provide the output bits to the microcontroller 230. The modulation by the transmitter 270 and the demodulation by the receiver 220 may be based on the communication mode. For example, if the communication mode is the MIMO multiplexing mode, the demodulation may be based on a phase relationship between the backscattered ambient RF signal received via the antenna 204 and the antenna 206. Further, if the communication mode is the spread spectrum coding mode, the modulation and demodulation may be based on a spread spectrum coding and decoding of the backscattered ambient RF signal received via the antenna 204 or the antenna 206.

The microcontroller 230 may decode the output bits from the receiver 220 to retrieve data. In some embodiments, the microcontroller 230 may control the output devices 250 based on the decoded data. In some embodiments, the power harvester 210 may be the sole power source for the ambient RF backscatter transceiver 200. The power harvester 210 may harvest power from the ambient RF signal and provide the harvested power to power the microcontroller 230, sensors 240, and output devices 250.

In some embodiments, the antenna 204 and/or the antenna 206 include a dipole antenna. The transmitter 270 may include a switching device (e.g., a transistor) connected across the two branches of the antenna 204. The input signal to the transmitter 270 from the microcontroller 230 may be modulated between a logical high value and a logical low value to encode a sequence of data bits. For example, when the input to the transmitter 270 is a logical low value, the transmitter 270 may be off and has no effect on the antenna 204 (e.g., presenting some nominal small amount of backscattering or non-reflected signal). When the input signal to the transmitter 270 is a logical high value, the transmitter 270 may be in a conducting state that shorts the two branches of the antenna 204, which results in a larger backscattered (e.g., reflected) signal amplitude. Thus, modulating of the transmitter 270 toggles the antenna 204 between the backscatter (reflective) and non-backscatter (non-reflective) states to convey bits to a receiver. In order to facilitate demodulating and decoding of the data encoded using the backscattered ambient RF signal at a receiving device (e.g., a receiver of another ambient RF backscatter transceiver), the modulation frequency of the transmitter 270 may be less than a modulation frequency of the ambient RF signal. This is because the ambient RF signal may already be encoded with data for another purpose (e.g., video data for a television channel), and encoding data at the same frequency may make it difficult or impossible to decipher the backscattered ambient RF signal data from the ambient RF signal data.

In an exemplary embodiment, implementation of the antenna 204 and/or the antenna include a 258 millimeter dipole antenna that is tuned for a subset of the ultra-high frequency (UHF) television (TV) band. The antenna 204 and/or the antenna 206 may each be a single antenna and/or omnidirectional with respect to a direction in which signals may be sent and received. Moreover, the receiver 220 may operate on only the input signal from a single antenna 204 without the need for a second antenna or even an estimated second antenna signal, or may operate on the input signals from both of the antenna 204 and the antenna 206. In other embodiments, implementation of the antenna 204 and/or the antenna 206 may include an antenna tuned for cellular, Wi-Fi, or other frequencies. Other antenna topologies such as meandered antennas and folded dipoles may also be used.

Further, RF switches may have a large difference between conducting and non-conducting impedance values for a specific frequency range, and little difference in other frequency ranges. Thus, a switching device of the transmitter 270 may be selected that has a large conducting and non-conducting impedance difference in the desired frequency range.

Note that the transmitter 270 and the antenna 204 may be capable of backscattering ambient RF signals across a tuned frequency band. In the example where the antenna 204 includes a 258 millimeter dipole antenna that is tuned for a subset of the ultra-high frequency (UHF) television (TV) band, the subset of the UHF frequency band may include a subset of frequencies that includes multiple channels. For example, in advanced television systems committee (ATSC) standards, each TV channel has a 6 MHz bandwidth with different TV channels allocated to adjacent non-overlapping frequencies. The transmitter 270 and the antenna 204 may be capable of backscattering a signal of any one of multiple channels as long as the channel frequency falls within the tuned frequency band of the transmitter 270 and the antenna 204.

The receiver 220 may receive and demodulate the backscattered ambient RF signal to provide output bits. As explained above, because the ambient RF signal is already encoded with information (e.g., video data for a television channel), reliably decoding additional data from the backscattered ambient RF signal may be difficult. Additionally, in some embodiments it is desired to decode the backscattered ambient RF signal using circuitry that requires little or no external power (e.g., without using power-hungry hardware components such as ADCs and oscillators). As explained above, ambient RF signals (e.g., TV and cellular transmissions) may be encoded with information (e.g. TV and/or cellular data) that is not controllable. Because the ambient RF signal is modulated based on encoded data, the instantaneous power level is constantly fluctuating based on the encoded data. Thus, the receiver 220 may be capable of decoding the backscattered ambient RF signal in the presence of the ambient RF signal with fast changing power levels. Further, the relative signal strength of the backscattered signal is small, making the signal-to-noise (SNR) ratio relatively small. Having a weak signal and low SNR may substantially limit data rate and communication distance. Thus, the receiver 220 may be capable of operating a MIMO multiplexing communication mode to improve data rate at relatively short distances (e.g., less than 8 feet), and a spread spectrum coding communication mode to improve communication reliability (e.g., at a cost of data rate) at longer distances (e.g., more than 8 feet). Note that the 8 feet threshold distance is an example, and other threshold distances may be used that are greater or less than 8 feet.

The transmitter 270 may modulate a backscatter of the ambient RF signal at a lower frequency than the modulation frequency of the ambient RF signals. While in the MIMO multiplexing communication mode, the receiver 220 may demodulate the backscattered ambient RF signal based on a phase difference between the ambient backscattered RF signal received at the antenna 204 and at the antenna 206. The antenna 204 and the antenna 206 are separated by a distance, which may result in a difference in distance from the transmitting transceiver. The difference in distance may result in a phase difference between the ambient RF signal received by each of the antenna 204 and 206. For example, the signals received at each antenna can be represented as follows:

$$y_1(t)=h_{rf}s(t)+h_bBs(t)$$

$$y_2(t)=h'_{rf}s(t)+h'_bBs(t)$$

where $y_1(t)$ is the signal received at the antenna 204 and $y_2(t)$ is the signal received at the antenna 206, $h_{rf}$ and $h'_{rf}$ are the ambient RF signals received at each respective antenna 204 and 206, $h_b$ and $h'_b$ are the backscattered ambient RF signals received at each respective antenna 204 and 206, and B is the data (e.g., B equals 1 when the ambient RF signal is reflected (e.g., backscattered) and 0 when the ambient RF signal is not reflected). Based on $y_1(t)$ and $y_1(t)$, the receiver 220 may demodulate the data by comparing a ratio of $y_1(t)$ and $y_2(t)$ $$\left(e.g., \frac{y_1(t)}{y_2(t)}\right),$$

which may be equal to either $$\frac{h_{rf}+h_b}{h'_{rf}+h'_b} \text{ or } \frac{h_{rf}}{h'_{rf}},$$

depending on the value of B. Normally, MIMO multiplexing demodulation requires channel estimation (e.g., phase and amplitude), but this simplified approach of using the ratio may allow the data to be demodulated without performing a channel estimation. In some examples, the distance between the antenna 204 and the antenna 206 is at least 0.2 feet.

While in the spread spectrum coding communication mode, the receiver 220 may demodulate the backscattered ambient RF signal, which is encoded using pseudorandom codes, received at the antenna 204. Normally, in spread spectrum coding, a receiver synchronizes with the transmit signal and decodes information by correlating with the pseudorandom codes. Typically, the correlation and synchronization can be computationally expensive. Thus, the transmitter 270 may backscatter the ambient RF signal to mimic a sine wave, because a sine wave can be detected without synchronization. Thus, instead of using pseudorandom bit sequences, the transmitter 270 backscatters the ambient RF signal as periodic sequences of alternating ones and zeroes as the code for a first value (e.g., a "1") and all zeroes as the code for a second value (e.g., a "0"). By coding using the alternating zeroes and ones, advantages of spread spectrum coding may be achieved (e.g., resistance to interference, which may allow transmission at greater distances) without requiring synchronization by the receiver 220.

The receiver 220 may be implemented using analog circuitry to demodulate the backscattered ambient RF signal in either the MIMO multiplexing communication mode or the spread spectrum coding mode. Specifically, embodiments of the receiver 220 may be implemented in analog circuitry only. In some embodiments, the receiver 220 may consume less than 400 μW of power.

Figure 3:
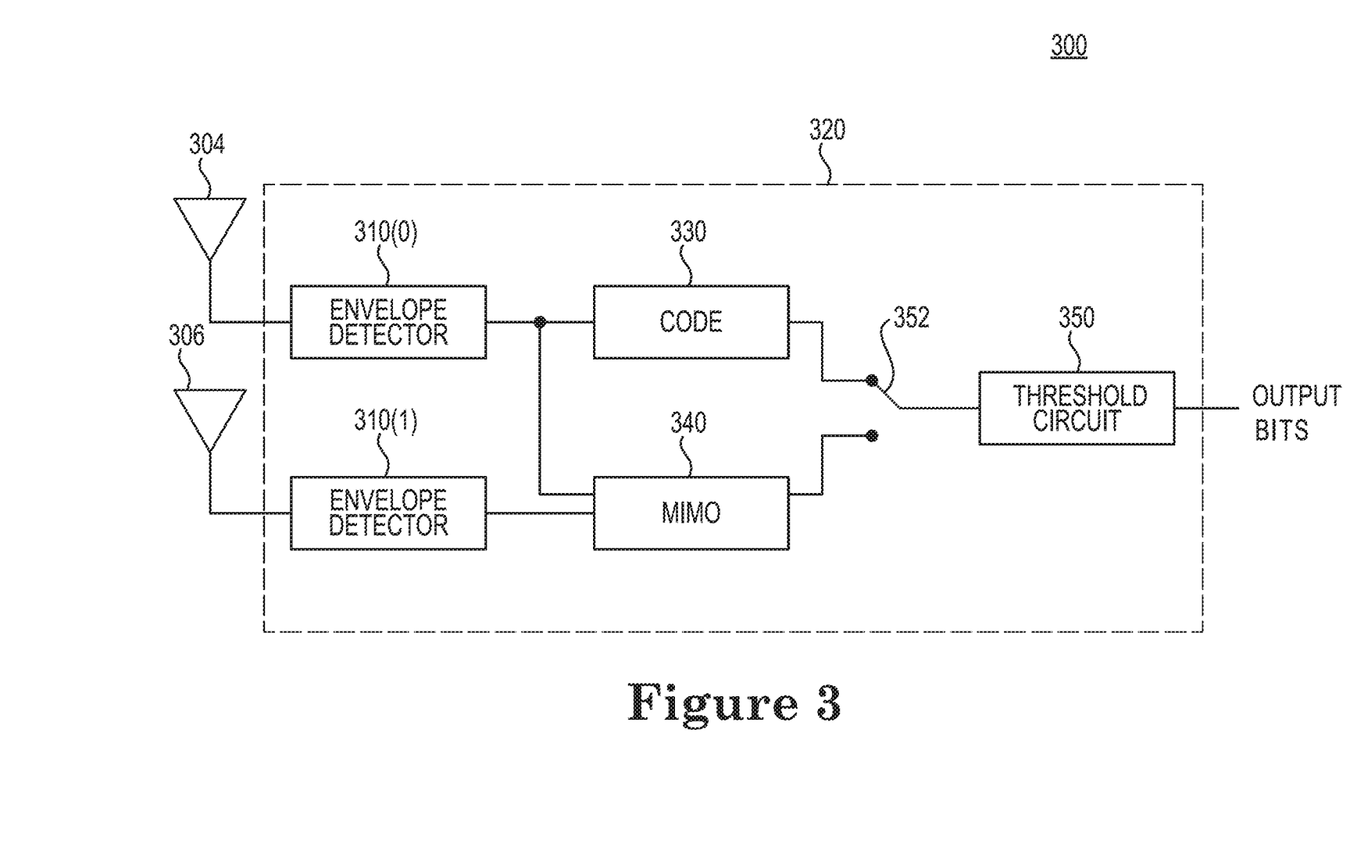
FIG. 3 is a block diagram of an ambient RF backscatter receiver according to an embodiment of the disclosure.

FIG. 3 depicts an ambient RF backscatter receiver 300 capable of demodulating a backscattered ambient RF signal. The ambient RF backscatter receiver 300 of may include a pair of antennae 304 and 306 coupled to a receiver 320. The antennae 304 and 306 may be implemented using the antenna 204 and/or 206 of FIG. 2. The receiver 320 may be implemented in the ambient RF backscatter transceivers 120(1-2) of FIG. 1, the receiver 220 of FIG. 2, or combinations thereof. As shown in FIG. 3, the receiver 320 may include an envelope detector 310(0) coupled to antenna 304 and an envelope detector 310(1) coupled to antenna 306. The envelope detector circuits 310(0-1) may smooth/average out the natural variations in the ambient RF signal. The receiver 320 may further include a spread spectrum code circuit code 330 coupled to the envelope detector 310(0), and a MIMO multiplexing circuit MIMO 340 coupled to both of the envelope detectors 310(0-1). The receiver 320 may further include a threshold circuit 350 selectively coupled to one of the code circuit 330 or the MIMO circuit 340 via the switch 352. The threshold circuit 350 may provide demodulated output bits at an output.

The code circuit 330 may include circuitry configured to demodulate the signal received from the envelope detector circuit 310(0). The code circuit 330 may include an in-phase/quadrature-phase (IQ) correlation circuit configured to demodulate the data encoded in the backscattered ambient RF signal. The code circuit 330 may further include a summation circuit configured to sum the in-phase (I) and quadrature-phase (Q) signals, and provide the sum to the switch 352.

The MIMO circuit 340 may include circuitry configured to demodulate the signals received from the envelope detector circuits 310(0-1). The MIMO circuit 340 may include a divider circuit that divides the signal from the envelope detector circuit 310(0) by the signal from the envelope detector circuit 310(1). The divided signal may be provided to the switch 352. The threshold circuit 350 may provide output bits based on the input from either the code circuit 330 or the MIMO circuit 340 via the switch 352.

In operation, the envelope detector circuits 310(0-1) receive the backscattered RF signal from the antennae 304 and 306, respectively. The antenna 304 may be located a different distance from a transmitting device than the antenna 306. The envelope detector circuits 310(0-1) provide a smoothing and filtering operation to remove the carrier signal and generate a signal envelope. The way in which the data is encoded in the backscattered ambient RF signal may be based on the communication mode that is currently enabled. In some embodiments, the receiver 320 may operate in a MIMO multiplexing communication mode or a spread spectrum code communication mode. In other embodiments, the receiver 320 may only operate in one of the MIMO multiplexing communication mode or the spread spectrum code communication mode.

While in the MIMO multiplexing communication mode, the MIMO circuit 340 may receive the signal envelopes from the envelope detector circuits 310(0-1). Because the antenna 304 and the antenna 306 are different distances from the transmitting backscatter transceiver, the backscattered ambient RF signal received at the antenna 304 may be shifted in phase relative to the backscattered ambient RF signal received at the antenna 306. The MIMO circuit 340 may exploit this phase difference to demodulate the information encoded in the backscattered ambient RF signal. For example, the MIMO circuit 340 may calculate the signal amplitude received from each respective envelope detector circuit 310(0-1), which may be represented as follows:

$$|y_1(t)|=|h_{rf}s(t)+h_bB(t)s(t)|$$

$$|y_2(t)|=|h'_{rf}s(t)+h'_bB(t)s(t)|$$

where $y_1(t)$ is the signal received at the antenna 304 and $y_2(t)$ is the signal received at the antenna 306, $h_{rf}$ and $h'_{rf}$ are the ambient RF signals received at each respective antenna 304 and 306, $h_b$ and $h'_b$ are the backscattered ambient RF signals received at each respective antenna 304 and 306, and B(t) is the encoded data (e.g., B(t) equals 1 when the ambient RF signal is reflected and 0 when the ambient RF signal is not reflected. Based on $y_1(t)$ and $y_1(t)$, the MIMO circuit 340 may demodulate the data by comparing a ratio of $|y_1(t)|$ and $|y_2(t)|$ $$\left(e.g., \frac{y_1(t)}{y_2(t)}\right),$$

which may be equal to either $$\frac{|h_{rf} + h_b|}{|h'_{rf} + h'_b|} \text{ or } \frac{|h_{rf}|}{|h'_{rf}|},$$

depending on the value of B(t). Thus, by computing a ratio of $|y_1(t)|$ and $|y_2(t)|$, the output is one of two distinct values. Note that the respective ratio value may vary for the same data based on relative position of the antennae 304 and 306 to the transmitting backscatter transceiver. Thus, the output of the divider circuit does not necessarily provide an output in which a larger ratio always represents a "1" and a smaller value always represents a "0." Coding schemes can be used to help in deciphering which ratio value indicates a "1" and which ratio value indicates a "0." Normally, MIMO multiplexing demodulation requires channel estimation (e.g., phase and amplitude), but this simplified approach may allow the data to be demodulated without performing a channel estimation. In some examples, the distance between the antenna 304 and the antenna 306 is at least 0.2 feet.

While in the spread spectrum code communication mode, the code circuit 330 may receive the signal envelope from the envelope detector circuit 310(0). In spread spectrum coding, the transmitting ambient RF backscatter transceiver transmits a data bit as pseudorandom string of bits called chips. For example, a "1" may be transmitted by a "1010 . . . N . . . 10" chip and a "0" may be transmitted by a "0000 . . . N . . . 00" chip, where N represents an integer number of bits following the same pattern. Generally, the larger N, the larger the signal-to-noise ratio, and thus the greater the distance two devices can communicate. By using a periodic sequence of "1010 . . . ", rather than a random sequence, the backscattered signal mimics a sine wave. A sine wave transmitted as a known frequency can be detected without having to synchronize with the transmitting ambient RF backscatter transceiver by computing a dot product operation with sine and cosine basis functions at the same frequency to compute the in-phase and quadrature-phase components. Thus, the code circuit 330 may use IQ correlation circuitry to demodulate the signal envelope. For example:

$$I = \Sigma_{t=0}^{T} \sin(ft+\Phi)\sin(ft)\Delta t = \tfrac{1}{2} \sin(\Phi)$$

$$Q = \Sigma_{t=0}^{T} \sin(ft+\Phi)\cos(ft)\Delta t = \tfrac{1}{2} \cos(\Phi)$$

where I is the in-phase component and Q is the quadrature-phase component, f is the frequency, Φ is the phase offset, and T is the duration of the over which the dot product is computed. Note that, from the above equations for I and Q, $$|I|^2 + |Q|^2 = \tfrac{1}{2}$$

Thus, since the above equation is independent of the phase offset, the code circuit 330 can demodulate the backscattered ambient RF signal without phase synchronization.

Further, the code circuit 330 may increase detection sensitivity by increasing the duration T. In an example where the transmitting ambient RF backscatter transceiver does not transmit a true sine wave, but rather an alternating chip sequence (e.g., "1010 . . . ") for a one bit and a zero chip sequence (e.g., "0000 . . . ") for a zero bit, the IQ relationship over a duration of N chips results in:

$$|I| + |Q| = N$$

In an example implementation, the code circuit 330 may compute a threshold value based on taking an average of a received signal over bits of a preamble at a beginning of a transmitted packet. Further, for a chip length of n, the code circuit 330 may then compute three |I|+|Q| values, each over a duration of n/3 chip bits. Each of the |I|+|Q| values is compared against a threshold, and if a majority of the in |I|+|Q| values exceed the computed threshold, the code circuit 330 outputs a one bit. Otherwise, the code circuit 330 outputs a zero bit. The reliable detection range of the code circuit 330 may be manipulated by adjusting the chip bit rate (e.g., a faster rate may results in shorter chip bit duration) and chip length (e.g., number of bits per chip). Give a chip rate, a longer chip length may result in a longer detection range due to decreased SNR. Further, the chip rate and chip length may be adjusted such that orthogonal codes can be created, which may allow for concurrent transmission.

The threshold circuit 350 may receive an output of one of the code circuit 330 or the MIMO circuit 340 via the switch 352. The switch 352 may be controlled by a microcontroller, such as the microcontroller 230 of FIG. 2, based on a communication mode. The threshold circuit 350 may determine a threshold value that is a rolling average of the output of the code circuit 330 or the MIMO circuit 340, and compare the output against the threshold value to determine whether the output is a one or a zero.

The maximum practical distance between two transceivers able to receive each other's backscattered communications may be determined in some examples based on a voltage difference detection capability of a comparator of the threshold circuit 350. As two ambient RF backscatter transceivers (e.g., the ambient RF backscatter transceivers 120(1-2) of FIG. 1), move farther apart, the backscattered ambient RF signal becomes more attenuated at the receiver 320. The comparator of the threshold circuit 350 may only be capable of detecting voltage differences between the first input and the second input that exceed a minimum gap threshold. The minimum gap threshold of the comparator may be used to determine the maximum distance at which two ambient RF backscatter transceivers can reliably communicate with each other. In some embodiments, the minimum gap threshold is 2.4 mV.

At the beginning of each packet transmission, ambient RF backscatter transceivers, such as the ambient RF backscatter transceivers 120(1-2), may transmit a known preamble. The receiver 320 may detect the preamble using bit-level correlation (e.g., at a microcontroller). Because an ambient RF backscatter transceiver may not know when another nearby ambient RF backscatter transceiver is transmitting, a microcontroller of the ambient RF backscatter transceiver may only begin detecting a packet when the receiver 320 detects bit transitions. The receiver 320 may operate using very little power, and has the built-in minimum gap threshold before it is capable of detecting bit transitions. It is only when the power difference crosses the minimum gap threshold in some examples that an interrupt may be sent to the microcontroller to wake the microcontroller up from an idle state in order to perform the bit-level correlation of the preamble.

It would be appreciated that, while the receiver 320 is shown with both the code circuit 330 and the MIMO circuit 340, the receiver 320 may be implemented using only one of the code circuit 330 or the MIMO circuit 340, or may be implemented with additional or different demodulation circuitry. FIG. 3 is depicted with a logical arrangement between the components of the receiver 320. It would be appreciated that any actual implementation may include an arrangement that is equivalent to the logical arrangement depicted in FIG. 3. For example, the MIMO circuit 340 may be coupled in series with the code circuit 330, but the code circuit 330 may have a pass-through mode that is activated while in the MIMO multiplexing communication mode. Further, while the code circuit 330 is only shown as being coupled to the antenna 304, alternatively the code circuit 330 may be coupled to the antenna 306, or may be selectively coupled to one of the antenna 304 or the antenna 306 via a switching element.

Figure 4:
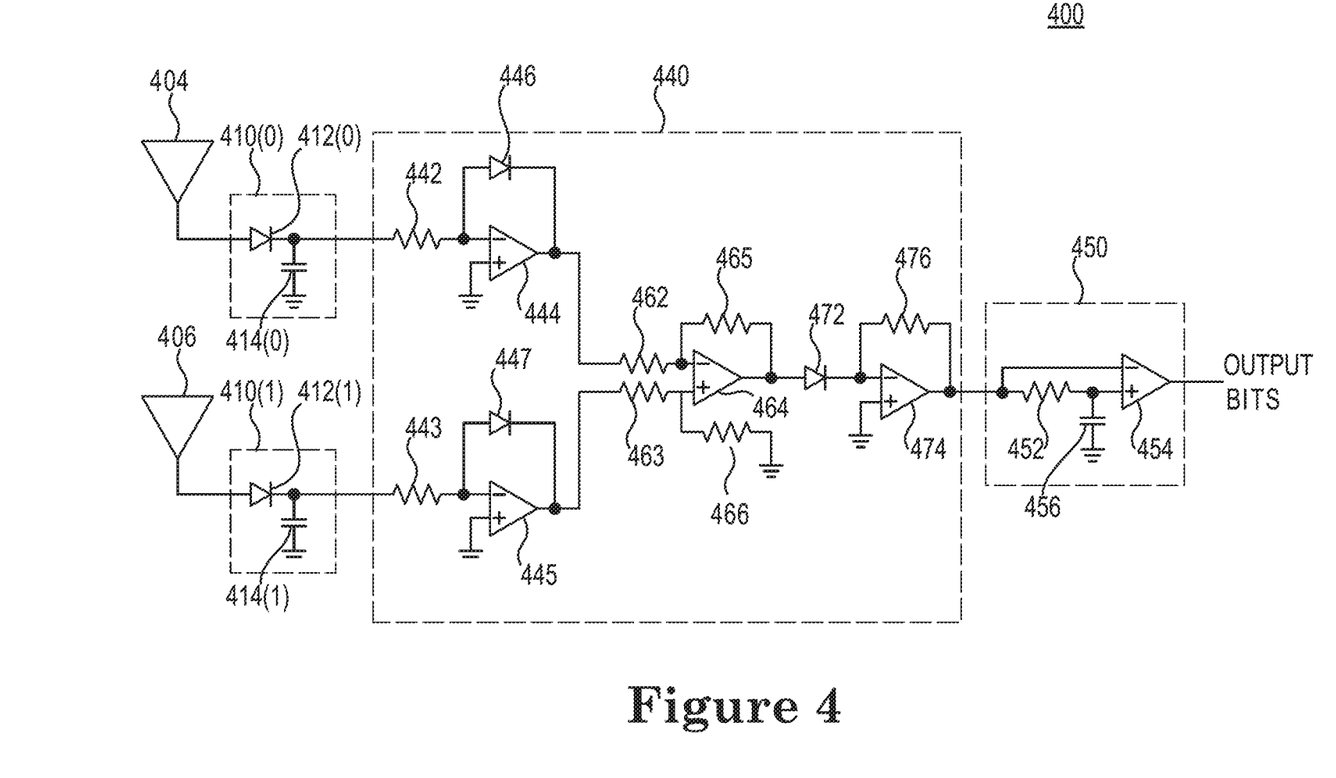
FIG. 4 is a block diagram of an ambient RF backscatter receiver according to an embodiment of the disclosure.

FIG. 4 depicts a MIMO multiplexing ambient RF backscatter receiver 400 capable of demodulating a backscattered ambient RF signal. The ambient RF backscatter receiver 400 may include a pair of antennae 404 and 406 each coupled to a respective envelope detector 410(0-1). The ambient RF backscatter receiver 400 may further include a MIMO circuit 440 coupled to each of the envelope detectors 410(0-1). The MIMO circuit 440 may provide a ratio of the signal envelopes received from the envelope detectors 410(0-1) at an output. The ambient RF backscatter receiver 400 may further include the threshold circuit 450 configured to demodulate the backscattered ambient RF signal to provide output bits based on the ratio provided by the MIMO circuit 440. The antennae 404 and 406 may be implemented in the ambient RF backscatter transceivers(1-2) of FIG. 1, the antenna 204 and/or 206 of FIG. 2, the antenna 304 and/or 306 of FIG. 3, or combinations thereof. The MIMO circuit 440 may be implemented in the ambient RF backscatter transceivers(1-2) of FIG. 1, the receiver 220 of FIG. 2, the MIMO circuit 340 of FIG. 3, or combinations thereof. The threshold circuit 450 may be implemented in the ambient RF backscatter transceivers(1-2) of FIG. 1, the receiver 220 of FIG. 2, the threshold circuit 350 of FIG. 3, or combinations thereof.

The envelope detector circuits 410(0-1) may smooth/average out the natural variations in the ambient RF signal. The averaging circuits 410(0-1) may each include a respective diode 412(0-1) connected to a respective capacitor 414(0-1). The respective diodes 412(0-1) may allow current to flow in one direction to the MIMO circuit 440. When the input voltage of the respective diode 412(0-1) is greater than the voltage at an input of the MIMO circuit 440, the respective diode 412(0-1) may provide the input voltage to the MIMO circuit 440, as well as charge the respective capacitor 414(0-1). When the input voltage of the respective diode 412(0-1) is lower than the voltage at an input of the MIMO circuit 440, the respective diode 412(0-1) does not provide the input voltage to the MIMO circuit 440, and the MIMO circuit 440 may slowly dissipate the charge stored on the respective capacitor 414(0-1). Values of components of the envelope detector circuits 410(0-1) may be based on the carrier frequency of the ambient RF signal and the effective carrier frequency of the backscattered ambient RF signal in order to prevent obscuring the data encoded in the backscattered ambient RF signal.

The MIMO circuit 440 may include circuitry configured to demodulate the signals received from the envelope detector circuits 410(0-1) using MIMO demodulation techniques. In order to implement the MIMO multiplexing demodulation using low power circuitry, the MIMO circuit 440 may take advantage of the following logarithmic relationship:

$$\frac{a}{b} = e^{\log(\frac{a}{b})} = e^{(\log(a)-\log(b))}$$

Specifically, to compute the quotient of two numbers (e.g., the amplitudes of two signals), the amplitudes may be transformed into the logarithmic domain, subtracted, and then convert back to the linear domain to get the result. The MIMO circuit 440 may include a logarithmic amplifier configured to transform each of the received signal envelopes (e.g., $|y_1(t)|$ and $|y_2(t)|$) from the envelope detector circuits 410(0-1) into the logarithmic domain. For example, the resistor 442, the amplifier 444, and the diode 446 may transform the signal envelope from the envelope detector circuit 410(0) to the logarithmic domain. Further, the resistor 443, the amplifier 445, and the diode 446 may transform the signal envelope from the envelope detector circuit 410(1) to the logarithmic domain. The logarithmic amplifiers convert a linear signal to the logarithmic domain by making use of the non-linear current-voltage (IV) relationship of a diode (e.g., the diodes 446 and 447, respectively). The MIMO circuit 440 may further include an analog subtractor circuit (e.g., resistors 462 and 463, amplifier 464, and resistor 465) to compute the difference between the log-scale signal amplitudes received from the outputs of the amplifiers 444 and 445. The MIMO circuit 440 may further include an exponential amplifier (e.g., the diode 472, amplifier 474, and resistor 476) configured to convert the output of the amplifier 464 to the linear domain. In some embodiments, because the log operation is monotonic and because the next operation is a threshold operation, the exponential amplifier may be omitted and the output of the 464 may be provided directly to the threshold circuit 450. Omitting the exponential amplifier may save power by reducing an active component count, and may not impact the performance of the ambient RF backscatter receiver 400 as the threshold operation is not impacted by the use of logarithmic domain signals.

The threshold circuit 450 may include a resistor 452 and a capacitor 456 coupled to a comparator 454. A first input of the comparator may be coupled to the output of the MIMO circuit 440. The resistor 452 may be coupled between the output of the MIMO circuit 440 and a second input of the comparator 454, and the capacitor 456 may be coupled between the second input of the comparator 454 and a reference node (e.g., a ground node). The comparator 454 may provide output bits based on the first input and the second input.

In operation, the envelope detector circuits 410(0-1) receive the backscattered RF signal from the antennae 404 and 406, respectively. The antenna 404 may be located a different distance from a transmitting device than the antenna 406. The envelope detector circuits 410(0-1) provide a smoothing and filtering operation to remove the carrier signal and generate a respective signal envelope to the MIMO circuit 440.

The MIMO circuit 440 may receive the signal envelopes from the envelope detector circuits 410(0-1). Because the 404 and the 406 are different distances from the transmitting backscatter transceiver, the backscattered ambient RF signal received at the antenna 404 may be shifted in phase relative to the backscattered ambient RF signal received at the antenna 406. The MIMO circuit 440 may exploit this phase difference to demodulate the information encoded in the backscattered ambient RF signal by computing a ratio between the signal envelopes.

The first logarithmic amplifier (e.g., the resistor 442, the amplifier 444, and the resistor 446) of the MIMO circuit 440 may transform the first signal envelope from the envelope detector circuit 410(0) into the logarithmic domain. The second logarithmic amplifier (e.g., the resistor 443, the amplifier 445, and the resistor 447) of the MIMO circuit 440 may transform the second signal envelope from the envelope detector circuit 410(1) into the logarithmic domain.

The analog subtractor circuit (e.g., resistors 462 and 463, amplifier 464, and resistor 465) may subtract the output of the amplifier 444 from the output of the amplifier 445 to generate a difference signal. In some embodiments, the difference signal may be provided directly to the threshold circuit 450. In other embodiments, the difference signal may be provided to the exponential amplifier (e.g., the diode 472, amplifier 474, and resistor 476) configured to transform the difference signal from the logarithmic domain to the linear domain.

The threshold circuit 450 may receive the output of the MIMO circuit 440 (e.g., either the difference signal or the output of the exponential amplifier depending on implementation). The role of the threshold circuit 450 may be to determine whether the output of the MIMO circuit 440 is one of two different voltage levels. Thus, the 452 and 456 of the threshold circuit 450 may determine threshold signal that is a mean of the two voltage levels by computing a rolling average of the output of the MIMO circuit 440. The threshold signal received at the second input of the 454 may be compared at the comparator 454 with the output of the MIMO circuit 440 received at the first input of the comparator 454. When the output of the MIMO circuit 440 is greater than the threshold signal, the comparator 454 may output a 1. Otherwise, the comparator 454 may output a zero. The minimum gap threshold of the comparator 454 may be used to determine the maximum distance at which two ambient RF backscatter transceivers can reliably communicate with each other. In some embodiments, the minimum gap threshold is 2.4 mV.

Figure 5:
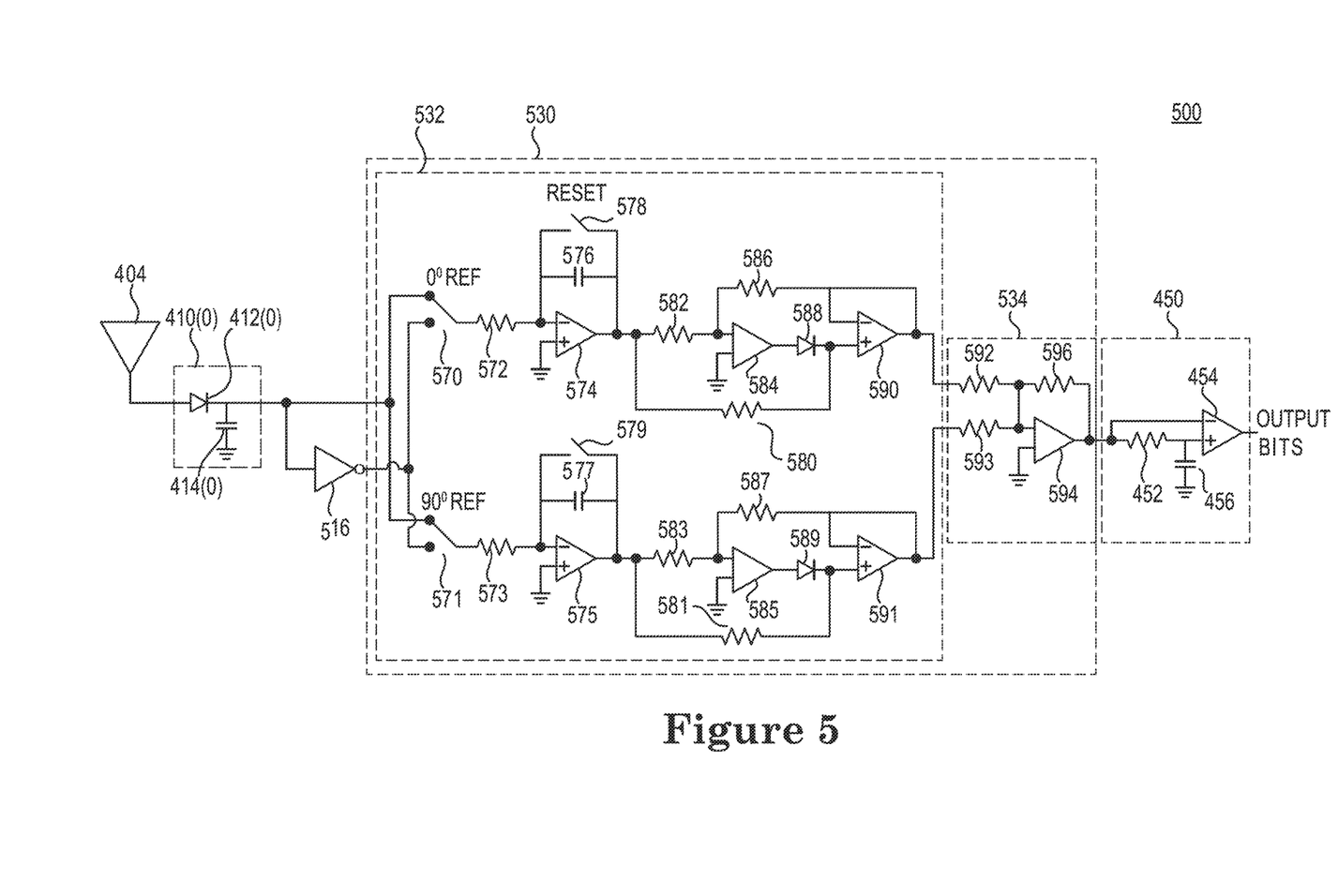
FIG. 5 is a block diagram of an ambient RF backscatter receiver according to an embodiment of the disclosure.

FIG. 5 depicts a spread spectrum ambient RF backscatter receiver 500 capable of demodulating a backscattered ambient RF signal. The ambient RF backscatter receiver 500 may include an antenna 404 coupled to an envelope detector 410(0). The ambient RF backscatter receiver 500 may further include a code circuit 530 coupled to the envelope detector 410(0). The code circuit 530 may generate and sum in-phase and quadrature-phase components based on the signal envelope received from the envelope detector 410(0). The ambient RF backscatter receiver 500 may further include the threshold circuit 450 configured to provide demodulated output bits based on the ratio received from the MIMO circuit 440 at an output. The code circuit 530 may be implemented in the ambient RF backscatter transceivers(1-2) of FIG. 1, the receiver 220 of FIG. 2, the 320 of FIG. 3, or combinations thereof. The ambient RF backscatter receiver 500 of FIG. 5 may include elements that have been previously described with respect to the ambient RF backscatter receiver 400 of FIG. 4. Those elements have been identified in FIG. 5 using the same reference numbers used in FIG. 4 and operation of the common elements is as previously described. Consequently, a detailed description of the operation of these particular elements will not be repeated in the interest of brevity.

The code circuit 530 may include circuitry configured to demodulate the signal envelope received from the envelope detector circuit 410(0) using spread spectrum demodulation techniques. In order to implement the spread spectrum demodulation using low power circuitry, the spread spectrum coding may mimic a sine wave such that a "1" bit value chip is represented using alternating ones and zeroes (e.g., a "1010 . . . N . . . 10" chip). Further, a "0" bit value chip may be represented using all zeroes (e.g., a "0000 . . . N . . . 00" chip). Note that N represents an integer number of bits following the same pattern. Generally, the larger N, the larger the signal-to-noise ratio, and thus the greater the distance two devices can communicate. Taking advantage of transmission of alternating ones and zeroes for a "1" bit value mimicking a sine wave is that IQ correlation may be used to demodulate the signal envelope.

Thus, the code circuit 530 may include an IQ computation circuit 532 configured to generate the |I| and |Q| components. Generation of each of the |I| and |Q| components may require three stages: multiply, accumulate, and absolute value. For example, the code circuit 530 may receive the signal envelope and an inverted signal envelope via the inverter 516. The IQ computation circuit 532 may include a switch 570 associated with the |I| component and a switch 571 associated with the |Q| component. The switches 570 and 571 are each configured to toggle between the signal envelope and the inverted signal envelope. The switches 570 and 571 may toggle every T seconds, where T is a length of a chip, with the toggle of the switch 570 based on a 0 degree reference and the toggle of the switch 571 offset from the toggle of the switch 570 by 90 degrees. The toggling of the switches 570 and 571 may be controlled by a microcontroller or an oscillator. The toggle of the switches 570 and 571 may perform the multiply operation for each of the |I| and |Q| components, respectively.

The switch 570 may be coupled to a first integrator (e.g., resistor 572, amplifier 574, and capacitor 576). The first integrator may perform the accumulation operation for the |I| component. Lastly, the first integrator may be coupled to a first absolute value circuit (e.g., resistor 580, resistor 582, amplifier 584, resistor 586, diode 588, and amplifier 590) that is configured to provide the magnitude of the output of the first integrator at an output as the |I| component.

The switch 571 may be coupled to a second integrator (e.g., resistor 573, amplifier 575, and capacitor 577). The second integrator may perform the accumulation operation for the |Q| component. Lastly, the second integrator may be coupled to a second absolute value circuit (e.g., resistor 581, resistor 583, amplifier 585, resistor 587, diode 589, and amplifier 592) that is configured to provide the magnitude of the output of the second integrator at an output as the |Q| component.

The code circuit 530 may further include a summation circuit 534 configured to sum the |I| and |Q| components provided from the IQ computation circuit 532. The summation circuit 534 may include a resistors 592, 593, and 596 and amplifier 594. The sum of the |I| and |Q| components may be provided to the threshold circuit 450, which may provide output bits based on whether the sum of the |I| and |Q| components exceeds a threshold value.

In operation, the ambient RF backscatter receiver 500 may use IQ correlation to demodulate the backscattered ambient RF signal. Thus, the code circuit 530 may receive, from the envelope detector 410(0), the signal envelope and the inverted signal envelope (via the inverter 516). The code circuit 530 may compute the |I| and |Q| components using the signal envelope and the inverted signal envelope my performing a dot product operation (e.g., a multiply and accumulate operation). The signal envelope may include chips that represent data bits. Each chip may have one of two different patterns (e.g., 1010 . . . N . . . 10 for a "1" or 0000 . . . N . . . 00) for a "0"). As previously described, of an alternating chip sequence over a duration of N chips may result in the following:

$$|I|+|Q|=N$$

Further, performing the same operation on a chip sequence of all zeroes may result in a sum of the |I| and |Q| components being less than N. The |I| component may be computed by multiplying the signal envelope and accumulating the multiplied signal envelopes via the switch 570 and the first integrator (e.g., resistor 572, amplifier 574, and capacitor 576), respectively. The accumulated value of the |I| component may be stored at the capacitor 576. The accumulated magnitude may be extracted via the first absolute value circuit (e.g., resistor 580, resistor 582, amplifier 584, resistor 586, diode 588, and amplifier 590). The |I| component may be provided at an output of the amplifier 590. The switch 570 may be modulated at a rate equal to the chip length. Between calculation of each in |I| component value, the switch 578 may be toggled (e.g., via a control signal from a microcontroller) to reset the voltage across the capacitor 576.

Similarly, the |Q| component may be computed by multiplying the signal envelope and accumulating the multiplied signal envelopes via the switch 571 and the second integrator (e.g., resistor 573, amplifier 575, and capacitor 577), respectively. The accumulated value of the |Q| component may be stored at the capacitor 577. The accumulated magnitude may be extracted via the first absolute value circuit (e.g., resistor 581, resistor 583, amplifier 585, resistor 587, diode 589, and amplifier 591). The |Q| component may be provided at an output of the amplifier 591. The switch 571 may be modulated at a rate equal to the chip length. Between calculation of each |Q| component value, the switch 579 may be toggled (e.g., via a control signal from a microcontroller) to reset the voltage across the capacitor 577.

The toggling of the switches 570 and 571 may be offset by 90 degrees to generate the |I| and |Q| components. The |I| and |Q| components provided at an output may be summed at the summation circuit 534. Because the sum of |I| and |Q| components is a first value when the chip is alternating ones and zeroes (e.g., a chip length if the timing is perfectly aligned with the chips) and as second value that is less than the first value when the chip is all zeroes, the threshold circuit 450 may distinguish between the two values and output a one or a zero based on the detected value.

In some embodiments, multiple receiving systems 500 or a single ambient RF backscatter receiver 500 with multiple code circuits 530 may be capable of decoding—orthogonal spread spectrum coded ambient RF backscatter transmissions in parallel. For example, for a chip rate C, transmissions can be provided that are orthogonal at 2NC, wherein N is a positive integer that are orthogonal to the chip rate C, and thus would not interfere with communication using the chip rate C. Therefore, coded transmissions with rates C, 2C, 4C, 8C, etc., may all be sent simultaneously without interfering with each other. By setting a particular value for C (say 100 Hz) and assigning different codes to different transmitter-receiver pairs, a respective code circuit 530 having the switches 570 and 571 modulated according to the respective chip rate can be used to enable concurrent interference-free transmissions.

Other modulation and carrier sense schemes may be used to encode the data for ambient backscatter transmission via the ambient RF backscatter transceivers. The data of a transmitted data packet may be generated from or based sensor data, input data, or data received from another ambient RF backscatter transceiver.

From the foregoing it will be appreciated that although specific embodiments of the technology have been described herein for purposes of illustration, various modifications may be made without deviating from the spirit and scope of the technology. Also, in some embodiments the microcontroller can be omitted, or the battery can be larger. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

What is claimed is:
1. An apparatus comprising:
a first antenna configured to receive a first version of a backscattered radio frequency (RF) signal, wherein the first version of the backscattered RF signal includes a first phase;
a second antenna configured to receive a second version of the backscattered RF signal, wherein the second version of the backscattered RF signal includes a second phase different than the first phase;
a receiver coupled to the first antenna and the second antenna, wherein the receiver comprises:
a first envelope detector circuit configured to filter out transitions of the first version of the backscattered RF signal received at the first antenna to provide a first signal envelope;
wherein the receiver is configured to utilize analog circuitry to perform demodulation of the backscattered RF signal to provide output bits using at least one of:
(1) multiple input, multiple output (MIMO) multiplexing demodulation, or
(2) spread spectrum code demodulation, wherein the spread spectrum code demodulation is based on demodulating the backscattered RF signal into a pseudorandom string of bits; and
power harvest circuitry configured to harvest power from the RF signal to power the demodulation.
2. The apparatus of claim 1, wherein the power harvest circuitry coupled to the first antenna, the power harvest circuitry further configured to receive the backscattered RF signal from the first antenna.
3. The apparatus of claim 1, further comprising:
a microcontroller coupled to the receiver and configured to decode the output bits to retrieve data provided by the backscattered RF signal, wherein the power harvest circuitry is further configured to provide the power that was harvested to the microcontroller.
4. The apparatus of claim 1, wherein the receiver further comprises:
a code circuit configured to provide a threshold value based on an average of I and Q values of the first signal envelope, the code circuit configured to compute the average of the I and Q values over a chip duration.

5. The apparatus of claim 4, wherein the receiver further comprises:
a threshold circuit configured to provide an output based on a comparison of the threshold value to a rolling average of threshold values provided by the code circuit.

6. The apparatus of claim 4, wherein the code circuit is further configured to demodulate the backscattered RF signal based on an in-phase and quadrature-phase correlation to generate the respective I and Q values.

7. The apparatus of claim 6, wherein the code circuit further comprises a summation circuit configured to add a magnitude of the in-phase component and a magnitude of the quadrature-phase component to generate a sum signal utilized in the average of the I and Q values.

8. The apparatus of claim 4, wherein the power harvest circuitry is further configured to provide the power that was harvested to the code circuit.

9. The apparatus of claim 1, wherein the receiver further comprises:
a second envelope detector circuit configured to filter out transitions of the second version of the backscattered RF signal received at the second antenna to provide a second signal envelope;
a multiple input, multiple output (MIMO) multiplexing demodulation circuit configured to determine a ratio of the first signal envelope to the second signal envelope; and
a threshold circuit configured to provide an output based on a comparison of a threshold value to the ratio of the first signal envelope to the second signal envelope.

10. An apparatus comprising:
an antenna configured to receive a backscattered radio frequency (RF) signal, the backscattered RF signal comprising data encoded using spread spectrum coding;
wherein a string of the backscattered RF signal having a first value is alternative ones and zeroes, and another string of the backscattered RF signal having a second value is all zeroes; and
a receiver coupled to the antenna, wherein the receiver is configured to demodulate the backscattered RF signal using a spread spectrum code demodulation circuit to provide output bits, wherein the spread spectrum code demodulation circuit comprises analog circuitry configured to discriminate between codes of the spread spectrum coding.

11. The apparatus of claim 10, wherein the spread spectrum code demodulation circuit configured to demodulate the backscattered RF signal based on a sum of a magnitudes of an in-phase component of the backscattered RF signal and a quadrature-phase component of the backscattered RF signal.

12. The apparatus of claim 10, further comprising:
a microcontroller coupled to the receiver and configured to decode the output bits to retrieve the data.

13. An apparatus comprising:
an antenna configured to receive a backscattered radio frequency (RF) signal, the backscattered RF signal comprising data encoded using spread spectrum coding; and
a receiver coupled to the antenna, wherein the receiver is configured to demodulate the backscattered RF signal using a spread spectrum code demodulation circuit to provide output bits, wherein the spread spectrum code demodulation circuit comprises analog circuitry configured to discriminate between codes of the spread spectrum coding; wherein the spread spectrum code demodulation circuit further comprises a summation circuit configured to add a magnitude of an in-phase component and a magnitude of a quadrature-phase component to produce a sum signal, wherein the summation circuit comprises:
an amplifier configured to provide the sum signal at an output based on the magnitude of the in-phase component and the magnitude of the quadrature-phase component received at a first input, wherein a second input of the amplifier is coupled to a reference node;
a first resistor configured to provide the magnitude of the in-phase signal to the first input of the amplifier; and
a second resistor configured to provide the magnitude of the quadrature-phase signal to the first input of the amplifier.

* * * * *